United States Patent [19]

Oogushi et al.

[11] Patent Number: 5,398,505
[45] Date of Patent: Mar. 21, 1995

[54] FLUID PRESSURE DRIVING SYSTEM

[75] Inventors: Naoki Oogushi; Hideki Nakayoshi, both of Kariya, Japan

[73] Assignee: Aisin Seiki Kabushiki Kaisha, Kariya, Japan

[21] Appl. No.: 142,927

[22] Filed: Oct. 29, 1993

[30] Foreign Application Priority Data

Oct. 29, 1992 [JP] Japan .................. 4-291734
May 31, 1993 [JP] Japan .................. 5-129686

[51] Int. Cl.$^6$ .................. F16D 31/02; F15B 11/00
[52] U.S. Cl. .................. 60/426; 60/444; 60/452; 60/489; 91/517; 91/532; 137/118; 418/30
[58] Field of Search .................. 91/516, 517, 518; 60/420, 426, 449, 448, 488, 489, 452; 137/118; 418/24, 27, 30; 123/41.12; 91/532

[56] References Cited

U.S. PATENT DOCUMENTS

| | | | |
|---|---|---|---|
| 4,366,783 | 1/1983 | Clemente | 123/41.12 |
| 4,538,974 | 9/1985 | Stich et al. | 418/30 X |
| 4,541,451 | 9/1985 | Wittren et al. | 137/118 |
| 4,616,671 | 10/1986 | Steinkuhl et al. | 137/118 X |
| 4,756,157 | 7/1988 | Appel | 60/444 |
| 5,127,226 | 7/1992 | Suzuki et al. | 91/532 X |
| 5,141,418 | 8/1992 | Ohtaki et al. | 418/30 X |
| 5,236,002 | 8/1993 | Martin et al. | 137/118 X |
| 5,241,821 | 9/1993 | Hoshino et al. | 91/518 X |

FOREIGN PATENT DOCUMENTS 61-215417  9/1986  Japan .
4-84779  7/1992  Japan .
4-194390  7/1992  Japan .

Primary Examiner—Edward K. Look
Assistant Examiner—Hoang Nguyen
Attorney, Agent, or Firm—Oblon, Spivak, McClelland, Maier & Neustadt

[57] ABSTRACT

A fluid pressure driving system for a vehicle includes a reservoir tank in which an amount of fluid is stored, a variable capacity oil pump sucking the fluid from the reservoir tank and discharging the resultant fluid, a control device for adjusting a quantity of the fluid discharged from the variable oil pump, and a distributor valve having an inlet port for receiving the fluid from the variable capacity oil pump. The distributor valve discharges a fixed amount of the fluid and the remaining amount of the fluid from a first outlet port thereof and a second outlet port thereof, respectively. A first passage connects the first outlet port of the distributor valve and the reservoir tank. A second passage connects the second outlet port of the distributor valve and the reservoir tank. A power steering device is associated with a steering wheel and disposed in the first passage. A hydraulic motor is disposed in the second passage, and a cooling fan is mounted rotatably on the hydraulic motor.

8 Claims, 3 Drawing Sheets

FLUID PRESSURE DRIVING SYSTEM

BACKGROUND OF THE INVENTION

1. Field of the Invention

The present invention relates to a fluid pressure driving system for a vehicle.

2. Description of the Related Art

In a conventional fluid pressure driving system which is shown in Japanese Patent Laid-open Print No. Sho61(1986)-215417, a power steering device associated with a steering wheel, an oil pump, and a hydraulic motor for rotating a cooling fan are connected in series for establishing a fluid circuit, and a switching valve is provided across the hydraulic motor. In the foregoing fluid pressure driving system, if the steering wheel is rotated through an angle while the vehicle is at rest or travelling at a low speed, the switching valve is brought into an open condition, regardless of the temperature of the engine cooling water, in order to supply fluid with top priority from the oil pump to the power steering device. This is due to the fact that such steering operation requires a large amount of fluid.

However, if the large amount of fluid is supplied to the power steering device, an insufficient amount of fluid may be supplied to the hydraulic motor, which may result in a low rotational speed of the cooling fan. This may render the cooling fan ineffective and, given a high temperature of the engine cooling water, there may be a fear of overheating of the engine.

SUMMARY OF THE INVENTION

It is, therefore, a primary object of the present invention to provide a fluid pressure driving system for a vehicle without the foregoing drawbacks.

In order to attain the foregoing and other objects, a fluid pressure driving system for a vehicle is comprised of a reservoir tank in which an amount of fluid is stored, a variable capacity oil pump sucking the fluid from the reservoir tank and discharging the resultant fluid, a control device for adjusting a quantity of the fluid discharged from the variable oil pump, and a distributor valve having an inlet port for receiving the fluid from the variable capacity oil pump. The distributor valve discharges a fixed amount of the fluid and the remaining amount of the fluid from the first outlet port and the second outlet port, respectively. A first passage connects the first outlet port of the distributor valve and the reservoir tank, a second passage connects the second outlet port of the distributor valve and the reservoir tank. A power steering device is associated with a steering wheel and is disposed in the first passage. A hydraulic motor is disposed in the second passage, and a cooling fan is mounted rotatably on the hydraulic motor.

BRIEF DESCRIPTION OF THE DRAWINGS

The above and other objects, features and advantages of the present invention will be more apparent and more readily appreciated from the following detailed description of preferred exemplary embodiment of the present invention, taken in connection with the accompanying drawings, in which.

DESCRIPTION OF THE PREFERRED EMBODIMENT

A preferred embodiment of the present invention will be described hereinunder in detail with reference to the accompanying drawings.

Figure 1:
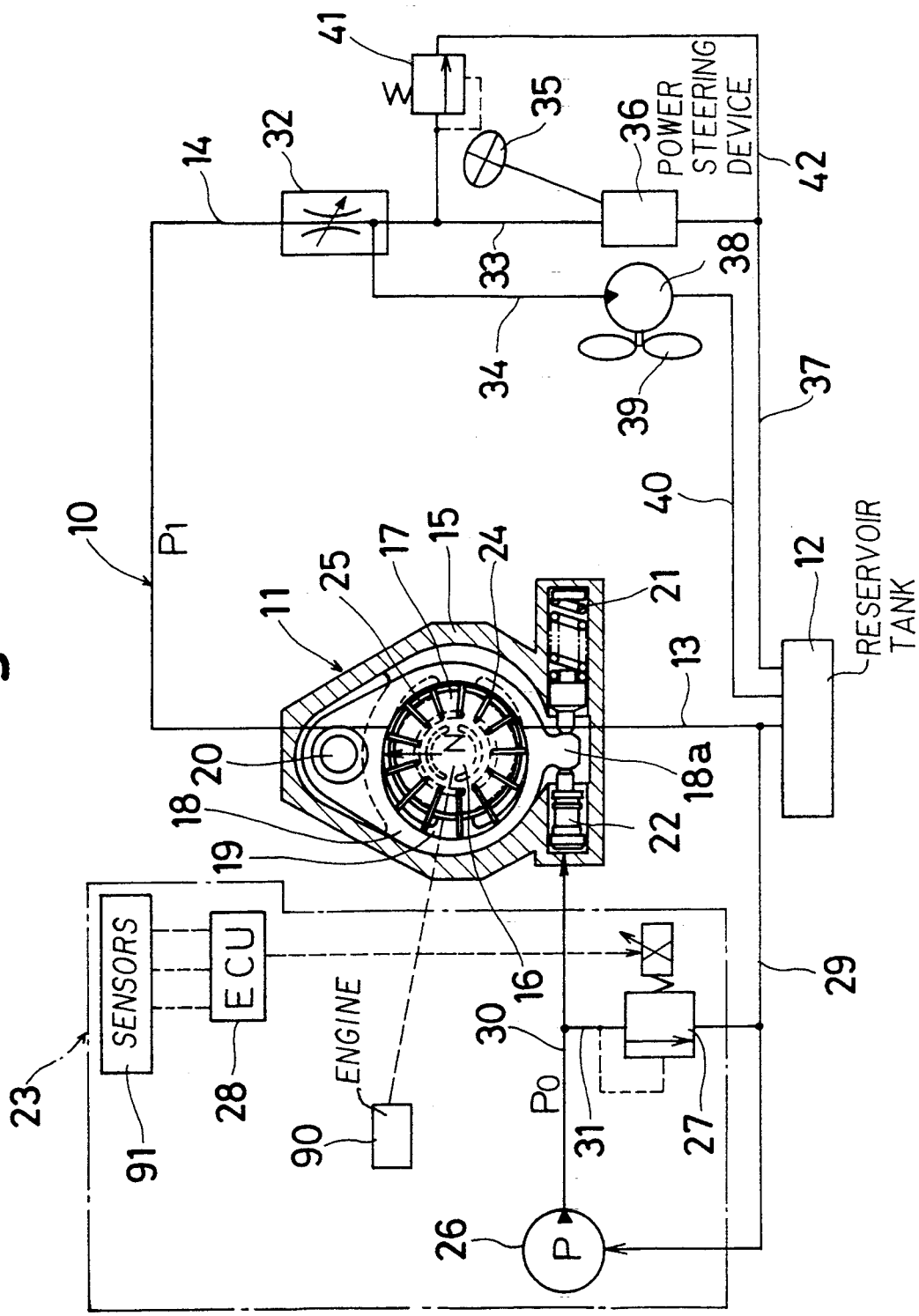
FIG. 1 is a schematic view of a fluid pressure driving system in accordance with one embodiment of the present invention.

Referring to FIG. 1, a fluid pressure driving system 10 for a vehicle includes a variable capacity oil pump 11 connected via an intake conduit 13 to a reservoir tank 12 so as to suck a quantity of fluid. The oil pump 11 is connected to a discharging conduit 14 through which the fluid is discharged from the oil pump 11. In a body 15 of the oil pump 11 there is accommodated or provided a rotor 17 which is rotatable together with a shaft 16 such as a crank shaft. Around the rotor 17 there is disposed a cam ring 18. An operation space 19 is defined between rotor 17 and cam ring 18. The cam ring 18 can be pivoted about a pin 20 which pivots the cam ring 18 to the body 15. The pin 20 is eccentric to the center of the rotor 17. The pivotal movement of the cam ring 18 about the pin 20 changes or varies the degree of eccentricity of the cam ring 18 relative to the rotor 17.

At a lower portion of the cam ring 18 there is formed a projection 18a which can be acted upon to pivot the cam ring. The projection 18a is urged by a spring 21 in the leftward direction (as seen in FIG. 1). A control piston 22 engages the projection 18a so as to oppose the biasing force of the spring 21. If the force applied to the projection 18a from the spring 21 (the control piston 22) becomes larger than that from the control piston 22 (the spring 21), the cam ring 18 is brought into clockwise (counter-clockwise) rotation, thereby increasing (decreasing) the eccentricity of the cam ring 18. It is to be noted that the biasing force applied to the projection 18a from the control piston 22 is depended on a control pressure from a discharging quantity control device 23 which will be detailed later.

An intake port 24 and a discharging port 25 are formed in the pump body 15 and are arranged along the circumferential direction of the rotor 17. The intake port 24 is in fluid communication with the intake conduit 13 and the operation space 19. The discharging port 25 is in fluid communication with the discharging conduit 14 and the operation space 19. The discharging port 25 is positioned such that a line L which connects the rotation center N of the rotor 17 and the circumferential middle point of the discharging port 25 makes an angle of about 90° relative to a direction along which the biasing force of the spring 21 acts.

A discharging quantity control device 23 regulates the pressure to be applied to the control piston 22, which will change or vary the eccentricity of the cam ring 18. The discharging quantity of the fluid from the oil pump 11 is regulated in accordance with the eccentricity of the cam ring 18. The discharging quantity control device 23 includes an auxiliary pump 26, a proportional regulating valve 27, and an electronic control unit such as a micro-processor, which will be referred to as ECU 28 hereinafter.

The auxiliary pump 26 is in the form of a constant capacity oil pump such as a trochoid pump. The auxiliary pump 26 sucks fluid via a intake conduit 29 from the reservoir tank 12 and discharges the fluid into a discharging conduit 30 which communicates with the control piston 22. Like the oil pump 11, the auxiliary pump 26 is so connected to the shaft 16 as to be driven by the engine 90. The proportional regulating valve 27 is fluidically positioned between a portion of the discharging conduit 30 and a portion of the intake conduit 29 in order to regulate or control the fluid pressure to be supplied to the control piston 22 in such a manner that the fluid pressure to the control piston 22 decreases as the proportional regulating valve 27 opens. The opening of this proportional regulating valve 27 is controlled by the ECU 28 and depends on conditions such as a cooling water temperature, engine rotation speed and other factors which are fed as signals from sensors 91 to the ECU 28.

The discharging conduit 14 is divided by a distribution valve 32 into a first passage 33 and a second passage 34 in order that a fixed amount of fluid flows in the first passage 33, which fixed amount is the minimum required for steering operation of a steering wheel 35. The surplus fluid flows through the second passage 34 and is defined as a difference between the total quantity of the discharged fluid from the oil pump 11 and the fixed quantity of the fluid passing through the first passage 33. The first passage 33 is connected with a power steering device 36 as a steering mechanism which is in association with the steering wheel 35. A downstream side of the power steering device 36 is connected via a downstream passage 37 to the reservoir tank 12. Between the first passage 33 and the downstream passage 37, is disposed a relief passage 42 having therein a relief valve 41 in parallel with the power steering device 36.

A hydraulic motor 38 is connected to the second passage 34 and is also connected via a downstream passage 40 to the reservoir tank 12. The hydraulic motor 38 is provided with a fan 39 which serves for cooling engine cooling water passing through an engine radiator (not shown). It is to be noted that instead of the connection of the relief passage 42 to the passage 37, the relief passage 42 can be connected to the downstream passage 40 of the hydraulic motor 38.

Figure 3:
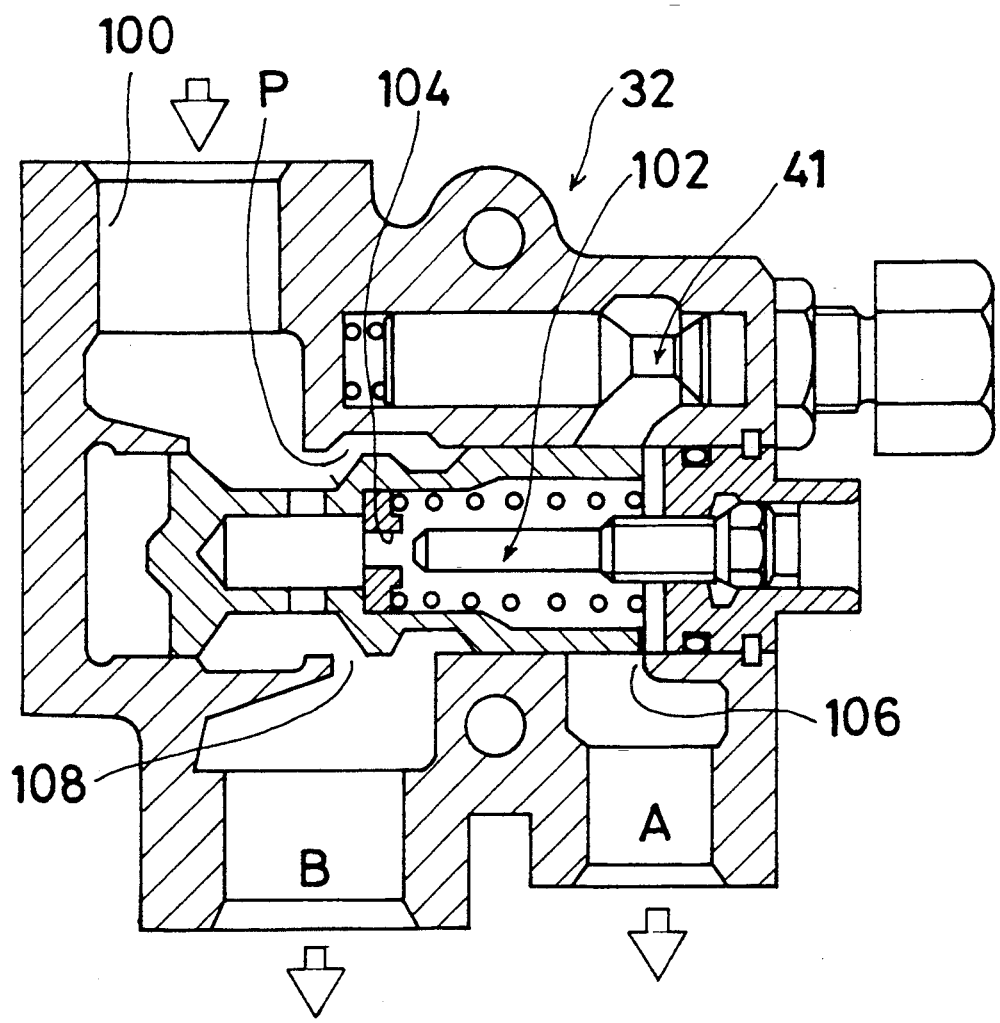
FIG. 3 illustrates an embodiment of a distributing valve incorporating a relief valve.

The distribution valve 32 can be embodied by a flow priority valve such as that shown in FIG. 3. The distribution valve 32 of FIG. 3 has a body including an inlet 100 connected to the discharging conduit 14 and houses a spool valve 102 biased to the left (as shown in the figure) by a spring. A first orifice 104 in the spool valve forms a portion of a first fluid flow passage P from the inlet to the outlet port A which is connected to the first passage 33, and so to the power steering device 36. The first flow passage P also traverses a second orifice 106 between the end of the spool valve 102 and a fixed portion of the distribution valve. The fluid from the inlet 100 can also traverse a second flow path to the outlet port B, which is connected to the second passage 34, and so to the hydraulic motor 38. It includes a third orifice 108 which tends to close as the spool valve 102 is moved to the left.

The position of the spool valve responds to the fluid pressure in the distribution valve to supply a fixed amount of fluid through the outlet port A. If the power steering device is operated, the pressure at the port A is increased and the spool is moved in the leftward direction to close the third orifice 108. The resulting pressure increase upstream of the third orifice causes the spool valve 102 to move to the right to an equilibrium position which maintains a fixed amount of fluid flowing through the outlet port A while modifying the fluid flow through the outlet port B.

The relief valve 42 is also incorporated into the valve body of FIG. 3. Thus, high fluid pressures move the spool valve to the left, thereby permitting relief of fluid pressure through the relief valve 42.

In operation, once the engine 90 has been started, a fixed amount of fluid is supplied to the power steering device 36 via the first passage 33 and the distributor valve 32. Therefore the parameters for control of the cam ring 18 by the ECU 28 can be confined to the requirements of the hydraulic motor 38, e.g., engine cooling water temperature.

If the temperature of the engine cooling water is low, the ECU 28 orders the proportional regulating valve 27 to narrow its opening or to close, so that the fluid pressure supplied to the control piston 22 is increased. This leads to a decrease of the eccentricity of the cam ring 18 relative to the rotor 17. The quantity of fluid discharged from the oil pump 11 is thus decreased, with the result that the quantity of the fluid which passes through the second passage 34 is decreased. In light of the fact that the rotation speed of the fluid motor 38 is in proportion to the fluid quantity which passes through the second passage 34, the decrease of fluid quantity reduces the rotation speed of the fluid motor 38.

On the other hand, if the temperature of the engine cooling water is high, the opening of the proportional regulating valve 27 increased by the ECU 28. Then, the fluid pressure supplied to the control piston 22 is decreased, so that the projection 18a is moved in the leftward direction by the spring 21. This causes clockwise rotation of the cam ring 18, which leads to an increase of the eccentric quantity thereof relative to the rotor 17. The fluid quantity discharged from the oil pump 11 therefore increases. The increase of the fluid quantity discharged from the oil pump 11 increases the fluid quantity passing through the second passage 34, so that the hydraulic motor 38 rotates at a high speed. The high speed rotation of the hydraulic motor 38 will cause high speed rotation of the cooling fan 38.

Figure 2:
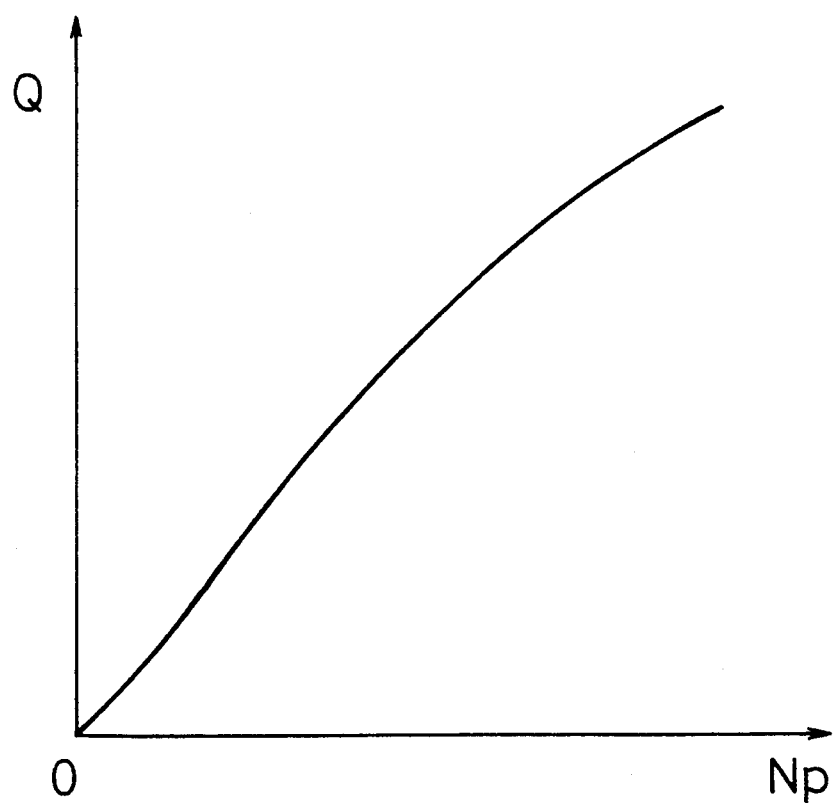
FIG. 2 is a graph showing the relationship between the discharged fluid quantity and the rotation of a rotor in the variable capacity oil pump used in the system in FIG. 1.

FIG. 2 shows a relationship between the rotation number or speed Np of the rotor 17 and the discharged quantity Q of the fluid from the oil pump 11 under the condition that the control piston 22 is not provided or is not operative. As seen from FIG. 2, the discharged quantity Q increases as the rotation number Np of the rotor 17 increases, and is not regulated. It is noted that in the present embodiment, the discharging port 25 is positioned in such a manner that a line which connects the rotation center N of the rotor 17 and the circumferential middle point of the discharging port 25 makes an angle of about 90° relative to a direction along which the biasing force of the spring 21 acts. Thus, the pressure of the discharged fluid will not disturb the action of the spring 21.

Even though the pressure of the discharged fluid from the oil pump 11 is varied as a result of the pressure variation in the power steering device 36 whenever the steering wheel 35 is rotated through an angle, the resultant pressure variation does not affect the action of the spring 21, and so the control of the discharged quantity of the fluid from the oil pump 11 is assured. The control of the quantity of fluid to be supplied to the fluid motor 38 is dependent on the temperature of the cooling water, and therefore the control of the rotation speed of the fan 39 driven by the fluid motor 38 is dependent on the temperature of the cooling water.

Regardless of the steering operation state, the rotational number of the cooling fan 39 is controlled in accordance with the temperature of the engine cooling water. Thus, even though the steering wheel 35 is rotated while the vehicle is at rest or is travelling at a low speed, the cooling fan 39 continues to operate, so that there is no concern of overheating of the engine 90.

The provision of the relief valve 41 in parallel with the power steering device 36 assures the return of the surplus fluid to the reservoir tank 12 by opening when the pressure in the first passage 33 is extremely high, e.g., when steering while the vehicle is not moving. Thus, an excess pressure in the fluid discharged from the oil pump 11 can be prevented.

The parallel arrangement of the hydraulic motor 38 with the power steering device 36 in the fluid line between the reservoir tank 12 and discharging port of the oil pump 11 assures a constant pressure for the fluid to be supplied to the hydraulic motor 38 even though a pressure variation occurs in the power steering device 36 as a result of successive steering operations while the vehicle is at rest or travels at low speed. Thus, a smooth rotation of the cooling fan 39 can be established without a beat sound.

The invention has thus been shown and described with reference to a specific embodiments, however, it should be noted that the invention is in no way limited to the details of the illustrated structures but changes and modifications may be made without departing from the scope of the appended claims.

What is claimed as new and is desired to be secured by Letters Patent of the United States is:

1. A fluid pressure driving system for a vehicle, comprising:
   a reservoir tank in which an amount of fluid is stored;
   a variable capacity oil pump having a suction inlet connected for sucking fluid from the reservoir tank and an outlet discharging a resultant fluid;
   a control device associated with the variable capacity oil pump so as to adjust a quantity of the resultant fluid discharged from the variable capacity oil pump;
   a distributor valve having an inlet port connected for receiving the resultant fluid from the outlet of the variable capacity oil pump, a first outlet port and a second outlet port, the distributor valve discharging a fixed amount of the fluid from the first outlet port and a remaining amount of the fluid from the second outlet port;
   a first passage connecting the first outlet port of the distributor valve and the reservoir tank;
   a second passage connecting the second outlet port of the distributor valve and the reservoir tank;
   a power steering device associated with a steering wheel and disposed in the first passage;
   a hydraulic motor disposed in the second passage;
   a cooling fan mounted rotatably on the hydraulic motor; and
   a relief valve connected fluidically in parallel with the power steering device.

2. A fluid pressure driving system for a vehicle, comprising:
   a reservoir tank in which an amount of fluid is stored;
   a variable capacity oil pump having a suction inlet connected for sucking fluid from the reservoir tank and an outlet discharging a resultant fluid, a variable capacity oil pump having a body, a cam ring pivoted to the body, a rotor rotatably mounted in the cam ring, and an operation space defined between the cam ring and the rotor, the operation space being varied in size as the cam ring pivots, so as to determine an amount of the resultant fluid discharged from the variable capacity oil pump;
   a control device connected for pivoting the cam ring;
   a distributor valve having an inlet port connected for receiving the resultant fluid from the outlet of the variable capacity oil pump, a first outlet port and a second outlet port, the distributor valve discharging a fixed amount of the fluid from the first outlet port and a remaining amount of the fluid from the second outlet port;
   a first passage connecting the first outlet port of the distributor valve and the reservoir tank;
   a second passage connecting the second outlet port of the distributor valve and the reservoir tank;
   a power steering device associated with a steering wheel and disposed in the first passage;
   a hydraulic motor disposed in the second passage;
   a cooling fan mounted rotatably on the hydraulic motor; and
   a relief valve connected fluidically in parallel with the power steering device.

3. A fluid pressure driving system in accordance with claim 2, wherein the control device includes an auxiliary pump and the cam ring has a projection, further including a spring urging the projection in one direction and a piston communicating with fluid pressure from the auxiliary pump for moving the piston and urging the projection in an other direction.

4. A fluid pressure driving system in accordance with claim 3, wherein the control device further includes an electronic control unit controlling the auxiliary pump, and at least an engine cooling water temperature sensor connected to the electronic control unit for supplying signals to the electronic control unit.

5. A fluid pressure driving system in accordance with claim 3, wherein the variable capacity oil pump has a discharging port formed in the body and extending along the circumferential direction of the rotor, said discharging port communicating the operation space with the inlet port of the distributor valve, wherein a line connecting a rotational center of the rotor and a circumferential middle point of the discharging port makes an angle of about 90° relative to a direction of a force applied by said spring.

6. A fluid pressure driving system in accordance with claim 5, wherein the control device further includes an electronic control unit controlling the auxiliary pump, and at least an engine cooling water temperature sensor connected to the electronic control unit for supplying signals to the electronic control unit.

7. A fluid pressure driving system for a vehicle comprising:
   a reservoir tank in which an amount of fluid is stored;
   a variable capacity oil pump sucking the fluid from the reservoir tank and discharging the resultant fluid;
   a control device for adjusting a quantity of the fluid discharged from the variable oil pump;
   a distributor valve having an inlet port for receiving the fluid from the variable capacity oil pump, a first outlet port, and a second outlet port, the distributor valve being expected to discharge a fixed amount of the fluid and the remaining amount of the fluid from the first outlet port and the second outlet port, respectively;
   a first passage connecting the first outlet port of the distributor valve and the reservoir tank;

a second passage connecting the second outlet port of the distributor valve and the reservoir tank;

a power steering device associated with a steering wheel and disposed in the first passage;

a hydraulic motor disposed in the second passage and being supplied therefrom the fluid continually so long as the variable capacity oil pump is in operation; and a cooling fan mounted rotatably on the hydraulic motor.

8. A fluid pressure driving system for a vehicle comprising:

a reservoir tank in which an amount of fluid is stored;

a variable capacity oil pump sucking the fluid from the reservoir tank and discharging the resultant fluid, the variable capacity oil pump having a body, a cam ring pivoted to the body, a rotor rotatably mounted in the cam ring, and an operation space defined between the cam ring and the rotor, the operation space being varied as the cam ring swings which determines the amount of the fluid discharged from the variable capacity oil pump;

a control device for swinging the cam ring;

a distributor valve having an inlet port for receiving the fluid from the variable capacity oil pump, a first outlet port, and a second outlet port, the distributor valve being expected to discharge a fixed amount of the fluid and the remaining amount of the fluid from the first outlet port and the second outlet port, respectively;

a first passage connecting the first outlet port of the distributor valve and the reservoir tank;

a second passage connecting the second outlet port of the distributor valve and the reservoir tank;

a power steering device associated with a steering wheel and disposed in the first passage;

a hydraulic motor disposed in the second passage and being supplied therefrom with the fluid continually so long as the variable capacity oil pump is in operation; and a cooling fan mounted rotatably on the hydraulic motor.

* * * * *